United States Patent [19]
Moore

[11] Patent Number: 5,988,427
[45] Date of Patent: Nov. 23, 1999

[54] ENVIRONMENTAL PROTECTION ARTICLE FOR TRANSPORT TRUCKS

[76] Inventor: Lonnie E. Moore, 6530 Marathon-Edenton Rd., Goshen, Ohio 45122

[21] Appl. No.: 09/059,015

[22] Filed: Apr. 13, 1998

[51] Int. Cl.⁶ .................................................. B65D 1/34
[52] U.S. Cl. ...................... 220/571; 137/312; 141/231; 220/573; 220/666
[58] Field of Search ........................... 222/627; 141/231; 220/666, 571, 573; 296/136; 293/106; 137/312

[56] References Cited

U.S. PATENT DOCUMENTS

| | | | |
|---|---|---|---|
| 2,854,049 | 9/1958 | Wyllie | 220/666 X |
| 3,257,031 | 6/1966 | Dietz | 222/627 X |
| 3,631,679 | 1/1972 | Fisch | 405/68 |
| 4,239,184 | 12/1980 | Dudar | 251/149.6 |
| 4,487,446 | 12/1984 | Reich, II | 293/106 |
| 4,671,024 | 6/1987 | Schumacher . | |
| 5,090,588 | 2/1992 | Van Romer et al. | 220/666 X |
| 5,099,872 | 3/1992 | Tarvin et al. . | |
| 5,316,175 | 5/1994 | Van Romer . | |
| 5,316,386 | 5/1994 | Moore | 220/573 X |
| 5,423,339 | 6/1995 | Latimer . | |
| 5,511,683 | 4/1996 | Dailey . | |
| 5,546,630 | 8/1996 | Long | 15/313 |
| 5,547,312 | 8/1996 | Schmitz, Jr. | 220/573 X |
| 5,620,018 | 4/1997 | Carpenter et al. . | |
| 5,642,834 | 7/1997 | Shaw et al. . | |
| 5,660,408 | 8/1997 | Johnson . | |
| 5,800,091 | 9/1998 | Van Romer | 220/573 X |
| 5,839,488 | 11/1998 | Peters | 141/347 |

*Primary Examiner*—Allan N. Shoap
*Assistant Examiner*—Joe Merek
*Attorney, Agent, or Firm*—Charles R. Wilson

[57] ABSTRACT

An environmental protection article is for use with transport trucks. The article is a carry-on article which is used in case of accidental fuel line or fuel tank leakage to receive and retain leaked liquid. The article comprises an open-top receptacle with an inflatable sidewall, an air supply tube extending to the sidewall and sealed thereto, and a quick connect valve secured to a distal end of the air supply tube. The article is folded to a compact state for easy storage. In case of emergency use, the driver of the truck can unfold the article and then connect a quick connect valve found on the truck's pressurized air hose to the mating quick connect valve of the article to readily and quickly inflate the open-top receptacle's sidewall to form a vessel. The article, once inflated, is simply slid under the source of leakage to receive and retain the leaked liquid.

12 Claims, 3 Drawing Sheets

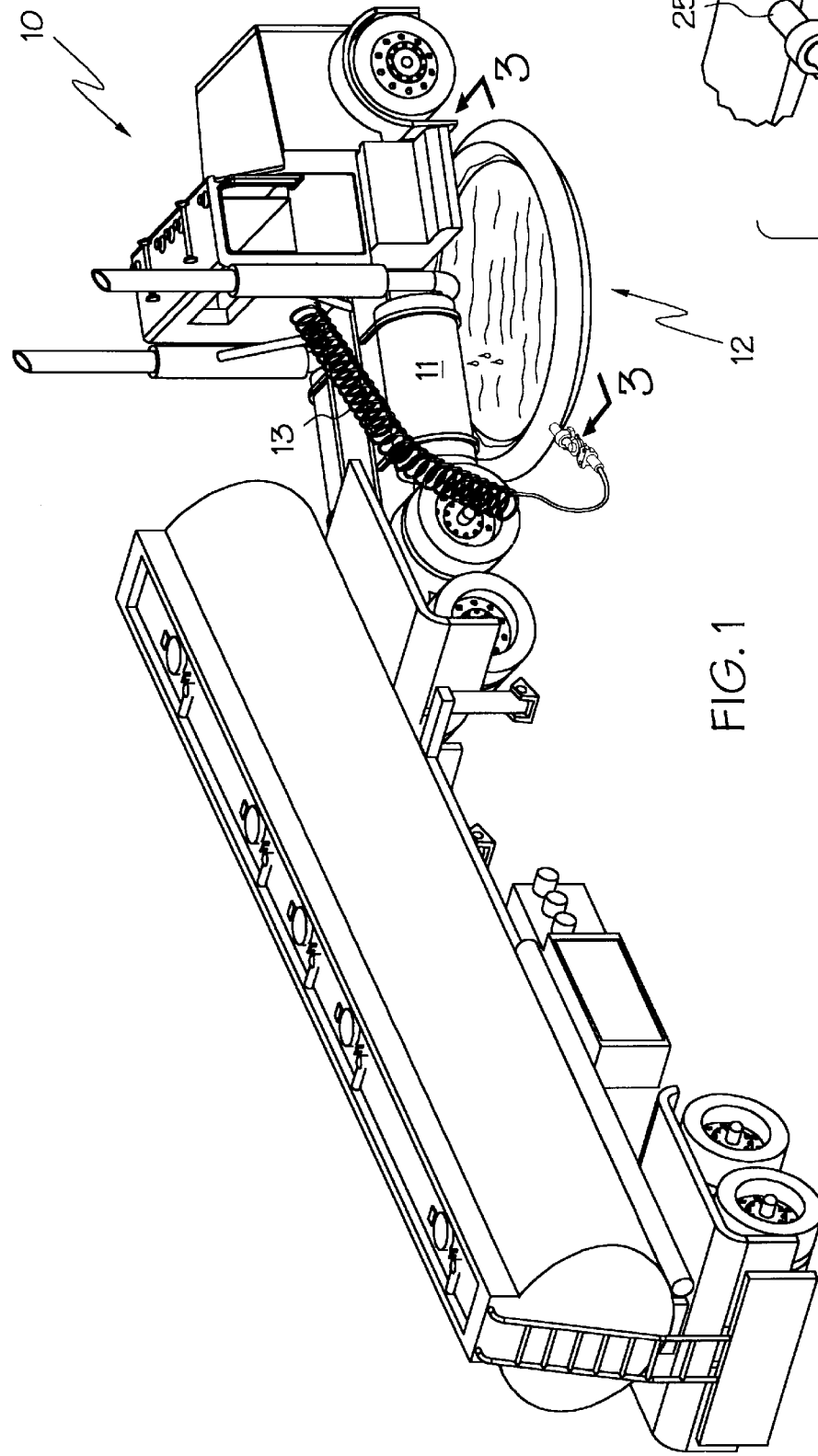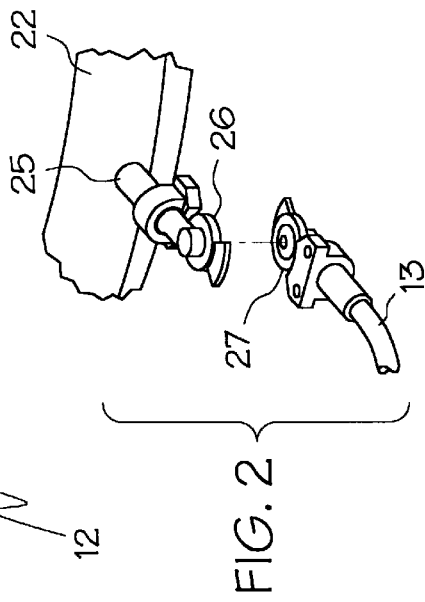

ENVIRONMENTAL PROTECTION ARTICLE FOR TRANSPORT TRUCKS

FIELD OF THE INVENTION

This invention relates to a carry-on article for use with a transport truck. More particularly, the invention relates to a carry-on environmental protection article to receive and retain leaked liquid from the transport truck.

BACKGROUND OF THE INVENTION

Roadways of the country are heavily travelled by transport trucks of all nature, including but not limited to tractor trailers and tanker trucks. A potential for an environmental and health problem by each of the numerous transport trucks is its own fuel tank. Necessarily, such fuel tanks have a high capacity, e.g. over 180 gallons. It is not uncommon for a truck traveling down a roadway to encounter road debris which may rupture a fuel line or even a fuel tank. Road debris certainly occurs and the truck's fuel line tends to be exposed and therefor susceptible to damage. The driver will normally be aware of any fuel line damage when it occurs. At the least, his suspicion will be aroused after running over some bulky object which somehow has made its way to the roadway.

The driver of the transport truck can pull over onto a bern of the roadway to inspect the truck's fuel line and possibly even the fuel tank. If there is leakage, the problem is what to do about it. It is unlikely any equipment damage can be repaired on site. An immediate health hazard to passing motorists is a concern, but not a significant one provided basic routine precautions are taken. A significant environmental hazard, however, has been created. Leaked fuel pollutes the soil and possibly a nearby water source. Moreover, Environmental Protection Agency regulations impose a substantial fine for spilled fuel and requires that the site be cleaned by the responsible party. The cleaning operation itself is costly.

A driver who encounters road debris in the roadway and suspects fuel line damage can assume the risk of continuing down the road until a truck repair facility of some nature is found or all fuel has been leaked. This action has the effect of spreading the hazard over a larger area, though certainly in a very dilute form. The more responsible driver will pull over. Any leakage will be confined to a small area. Unfortunately, the more responsible action is also the costliest action. The driver will be responsible for a fine and clean-up costs. This presumes the driver has no means of stopping the leak and/or somehow catching the leaked liquid for subsequent safe disposal.

Another potential for an accidental spill of liquid material comes from tractor trailers carrying drums, typically, 55 gallons of liquid and tanker trucks. Some of the liquids are detrimental to the environment. One or more individual drums in a tractor trailer can leak or spill liquid which will seep out of the trailer and onto the roadway. A tanker truck can spill its entire load which creates an immediate hazard of enormous proportions. Even a slow leak of a few gallons per hour must be attended to before it builds up to become a major problem. Trained personnel are needed to contain and ultimately eliminate the danger from a major spill. The minor spill is more susceptible to containment and clean-up by the driver alone.

In accord with a need well recognized by those in the transport truck industry, there has now been developed an article for receiving and retaining liquid which accidently leaks from a transport truck's fuel line or fuel tank. The article is economical, requires minimal cab storage space, its use is readily understood, it is placed in position within seconds of ascertaining a need, and it is effective for its intended use.

SUMMARY OF THE INVENTION

An environmental protection article is intended as a carry-on article for a transport truck. The article has an open-top receptacle with an air supply tube extending to a sidewall of the receptacle and further has a quick connect valve secured to a distal end of the air supply tube. The article is capable of being folded to a compact state for storage in the transport truck. In case of liquid leakage, the article is unfolded and capable of being readily inflated on site to form a vessel which can contain leaked liquid. A quick connect valve found on the truck's pressurized air hose is readily connected to the quick connect valve on the article's air supply tube. The pressurized air quickly inflates sidewalls of the open-top receptacle to create an upstanding sidewall. The inflated open-top receptacle is then simply slid under the truck at the source of the leak to receive and retain the liquid.

BRIEF DESCRIPTION OF THE DRAWINGS

FIG. 1 is an environmental view of the carry-on environmental protection article of the invention fully inflated and positioned under a source of leaked fuel from a transport tank's fuel line.

FIG. 2 is a partial view showing the quick connect valve of the carry-on environmental protection article of FIG. 1 in position to receive a mating quick connect valve found on an air hose of the transport truck.

DETAILED DESCRIPTION OF THE INVENTION

The environmental protection article of the invention is particularly useful as a carry-on article to be stored in a cab of transport trucks and used for receiving and retaining leakage from the truck's fuel line or fuel tank. The article is also useful in other areas where there exist a need to quickly contain a limited quantity of liquid from spreading beyond a confined area. While the description which follows and the drawings are directed to the primary use of receiving and retaining fuel leaking from a truck, it should be understood other uses are contemplated.

With reference to FIG. 1, there is shown a transport truck 10 with a fuel tank 11. A fuel line (not shown) leads from the fuel tank to the truck's motor. As apparent, fuel is leaking. In accord with this invention, the carry-on environmental protection article 12 is fully inflated and slid into position under the source of leaking. Fuel is being dripped directly into the article for retention and safe disposal at a subsequent time.

Still with reference to FIG. 1, the article 12 is attached to a flexible curled pressurized air hose 13. Transport trucks typically have two such pressurized air hoses, though there is only one shown in FIG. 1 for clarity purposes. One hose is known as the emergency line and the second hose is known as the service line. The emergency line is shown. It is charged with air under high pressure at all times. The service line is only charged with air when the operator applies brakes on the truck, usually by depression of a brake pedal. The service and emergency air lines commonly are permanently connected at the tractor's back cab wall through a fitting which leads to a pressurized air source. The two lines extend back to the tractor. Each line terminates at the tractor with a quick connect valve. Mating quick connect valves are mounted on the trailer.

The carry-on environmental protection article 12 of the invention is adapted to work in conjunction with one of the pressurized air hoses and associated quick connect valve found on a typical transport truck. Preferably and as shown, the emergency pressurized air hose 13 of the truck is utilized since it is the quickest and easiest accessed. The article utilizes the existing pressurized air to quickly create a large capacity vessel from a folded compact article.

Figure 4:
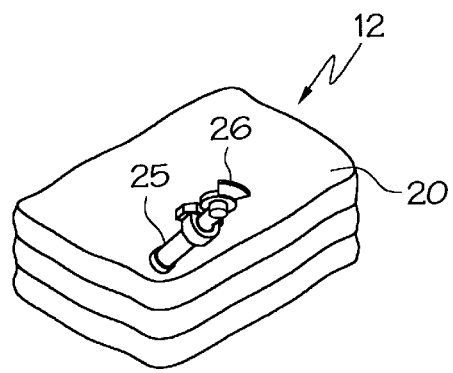
FIG. 4 is a perspective view of the carry-on environmental protection article of FIG. 1 partially folded to a compact state for storage purposes.

The article 12 of the invention in its folded state is shown in FIG. 4. It is most conveniently stored in the tractor's cab area or a tool/safety box. It can be stored in its own specialized box.

Figure 3:
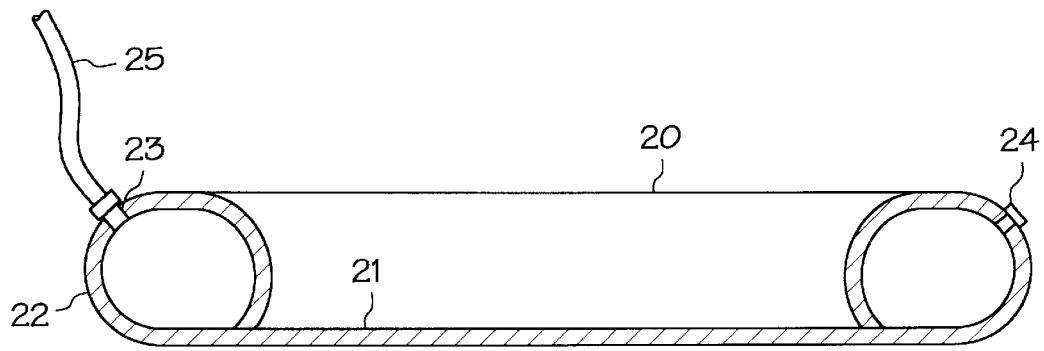
FIG. 3 is an elevational view in section of the carry-on environmental protection article of FIG. 1 taken along line 3—3 thereof.

As best seen in FIGS. 1 and 3, the article 12 comprises an open-top receptacle 20 of a flexible liquid impervious material. A polymeric material having such characteristics is preferred. The receptacle 20 has a flat single ply bottom wall 21 and a sidewall 22 sealed to it. The sidewall is hollow and inflatable. Together the bottom wall and sidewall form a vessel of sufficient capacity to hold a substantial if not all the fuel contained in a typical fuel tank. That is, it holds at least about 180 gallons, preferably from about 180 gallons to about 225 gallons of liquid. While the receptacle 20 has a round shape, it can be any shape, including oval, square and rectangular. The round shape is preferred for optimum surface receiving area and liquid volume. Preferably, the receptacle has a diameter of from about two feet to about five feet and a substantially vertical sidewall of from about sixteen inches to about twenty-four inches.

The receptacle 20 also has a check valve 23 mounted in the sidewall. The valve is a one-way valve which allows pressurized air to pass into the receptacle, but prevents its escape. A release valve 24 is also mounted in the receptacle's sidewall to release air to deflate the receptacle at an appropriate time as discussed further below.

An air supply tube 25 is sealed at a proximal end to the sidewall 22 of the receptacle 20. It is in communication with the check valve 23 mounted in the sidewall and the hollow interior of the sidewall. The tube 25 is used to supply pressurized air into the sidewall's hollow interior. The tube can be any convenient length and diameter. Typically, a tube having a length of from about one inch to about five feet is adequate.

As best seen in FIG. 2, a quick connect valve 26 is secured to a distal end of the air supply tube 25. The quick connect valve 26 is adapted to mate with a mating quick connect valve 27 found on the truck's pressurized emergency air hose 13. Several quick connect valves for pressurized air lines are known. Most commonly used and highly preferred are gladhand connectors. A gladhand connector consists of two functionally identical moieties with threaded connection to an air hose or pipe. Each half of the connector has a pneumatic pressure outlet/inlet port in one face. The port has an elastomeric seal having an approximately flat annular face around the port. When the coupling is connected, the two moieties have their respective ports in direct communication, and one therefore serves as inlet while the other serves as an outlet.

Each moiety of the gladhand connector has a wing at one end with an arcuate locking surface concentric with the port. At the other end of the gladhand there is a pocket open at one end and having an arcuate locking surface concentric with the port. To assemble the gladhand connector the rubber seals are placed in face to face engagement. One-half of the connector is then twisted relative to the other around the axis of the port so that the wing on each half enters the open end of the pocket on the other half. The locking surfaces engage each other to hold the connector halves in tight engagement. A short twist in the opposite direction disconnects the connector halves.

In operation, the carry-on environmental protection article is folded to a compact state and stored in the truck's cab area or perhaps storage area. In the event of fuel line of full tank damage sufficient to rupture a wall and cause leakage, the driver can pull onto the bern of the road knowing that he has a ready solution to the problem. The article of the invention is initially unfolded. A quick connect valve of the emergency pressurized service line is disconnected from the trailer. It is then matched and operatively mated with the quick connect valve found on the air supply tube of the article. The sidewall of the article's receptacle is quickly inflated. When the sidewall is fully inflated, a vessel is created with an upstanding and substantially rigid sidewall. The article is simply slipped under the source of leakage to catch and retain it. This is all accomplished in a matter of minutes—prior to any substantial damage to the environment.

When the source of leakage has been repaired or at least stopped, the driver can safely dispose of the contained liquid. The article is cleaned and folded again for storage and possible future use.

Figure 6:
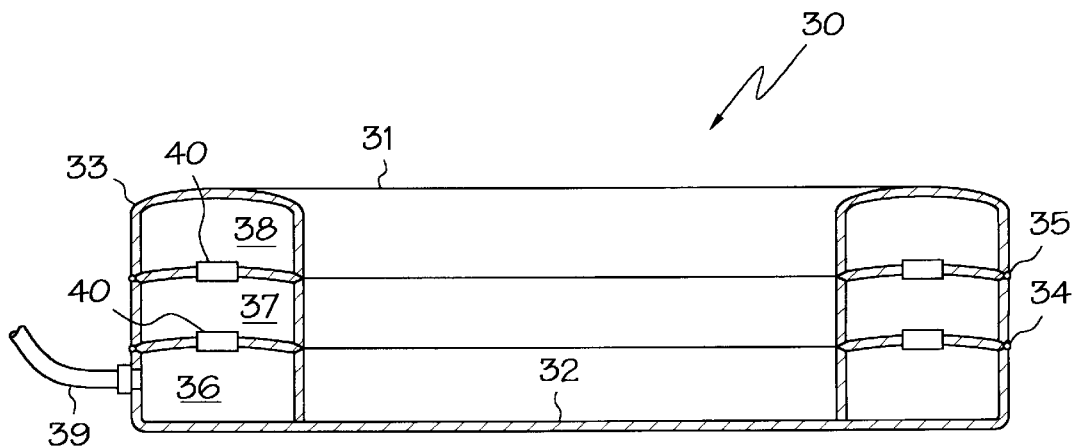
FIG. 6 is an elevational view in section of the carry-on environmental protection article of FIG. 5 showing three inflatable sidewall sections.
Figure 5:
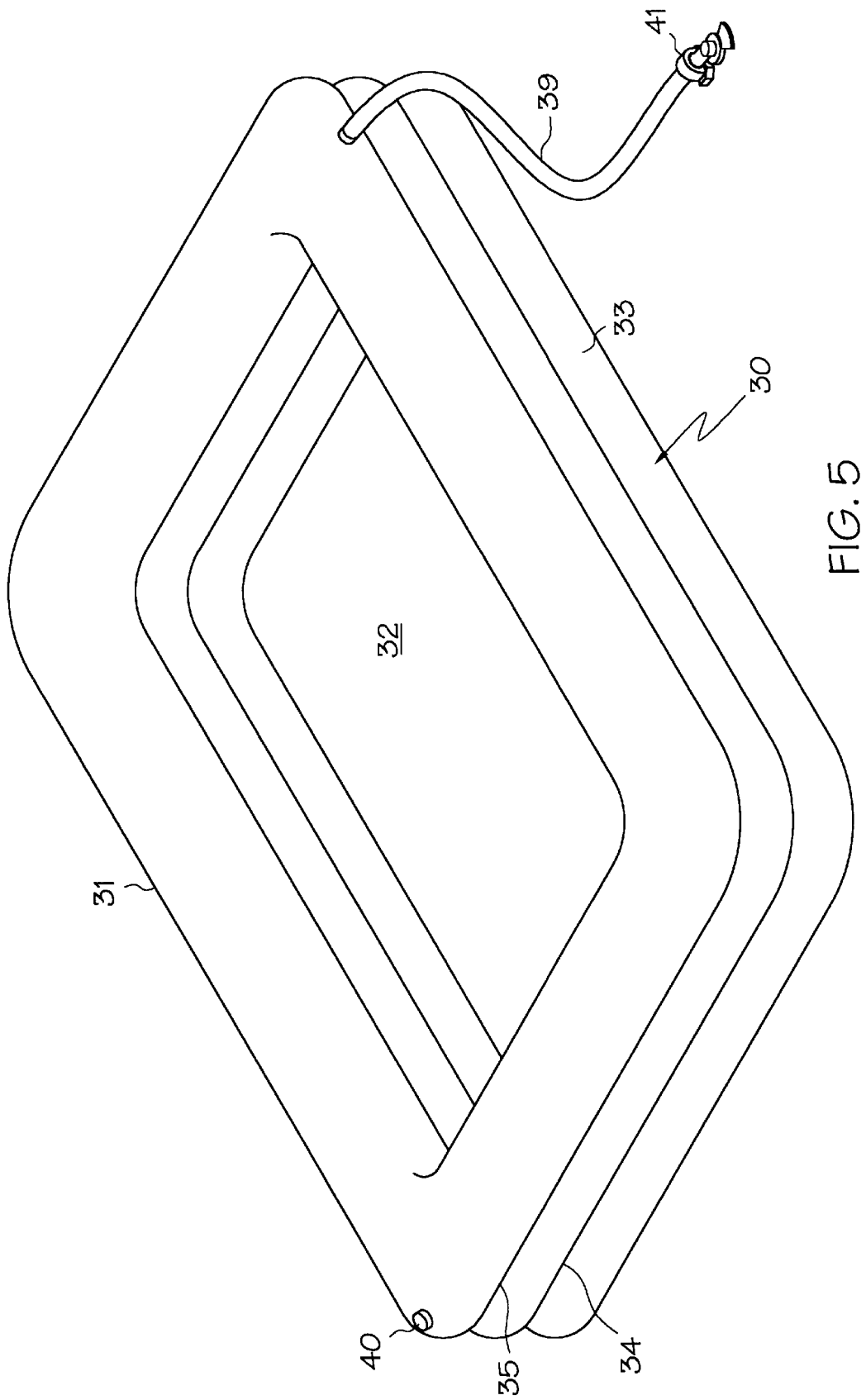
FIG. 5 is a view in perspective of an alternative carry-on environmental protection article of the invention.

FIGS. 5 and 6 illustrate another carry-on environmental protection article 30 of the invention having a different shape. A rectangular shaped open-top receptacle 31 has the advantage of being dimensioned to approximate the width and length of a tractor where the fuel line and fuel tank are located. A precise leak source is not always apparent, especially when the leak occurs at night. As such, the article can be slipped between front and back wheels of the tractor and the driver reasonably assured that it will be properly positioned to catch leakage regardless of the precise point where the leak is located. Additionally, in case of multiple sources of leakage, the article 30 is dimensioned to catch leakage from all the leaking areas.

The receptacle 31 has a bottom wall 32 and a sidewall 33 length of from about four feet to about eight feet and a width of from about two feet to about five feet. Preferably, it has a length of from about five feet to about seven feet and a width of from about two and one-half feet to about four feet. The height of its sidewall ranges from about ten inches to about twenty inches, preferably about fourteen inches to about eighteen inches.

The sidewalls 33 of the open-top receptacle 31 has reinforcing ribs 34 and 35 extending around its sidewalls. Each rib is substantially equi-spaced. Such reinforcing strengthens the sidewalls by preventing ballooning. In a highly preferred embodiment and as illustrated, the receptacle 31 has two or more independently inflatable sections. Sections 36, 37 and 38 are shown in FIG. 6. An air supply tube 39 is secured to the lower section 36 to inflate that section first. This allows the driver to more quickly position the article under the source of leakage. The lower section 36 of the sidewall once inflated will create a vessel of sufficient capacity to immediately receive leakage and prevent further soil contamination. The middle section 37 and upper section 38 are subsequently inflated to create a larger capacity vessel. As best seen in FIG. 6, conventional pressure release valves 40 in the lower section's top wall and the middle section's top wall open after the respective section reaches a certain air pressure sufficient to create an upstanding sidewall. A gladhand 41 identical in structure to that discussed above in regard to FIGS. 1–4 is attached to the distal end of the air supply tube 39.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A carry-on environmental protection article for a transport truck having a pressurized air hose with a gladhand connector, said article for receiving and retaining leaked liquid from the transport truck, whereby said article is capable of folding to a compact state for easy storage in the transport truck during non-use and readily inflated on site to form an open-top receptacle with upstanding sidewalls for insertion below a source of leaking, said carry-on environmental protection article comprising:

(a) an open-top receptacle of a flexible liquid impervious material having a bottom wall and an inflatable sidewall;

(b) an air supply tube having a proximal end and a distal end with the proximal end secured to the sidewall of the open-top receptacle and in communication with an interior of the sidewall; and (c) a mating gladhand connector secured to the distal end of the air supply tube for connecting to the gladhand connector found on the air hose of the transport truck so that pressurized air from the transport truck can quickly inflate the sidewall of the open-top receptacle to form a vessel to receive the leaked liquid.

2. The carry-on article of claim 1 wherein the open-top receptacle has a capacity of at least about 180 gallons when said receptacle's sidewall is fully inflated.

3. The carry-on article of claim 2 wherein the open-top receptacle is rounded with a diameter of from about two feet to about five feet and a sidewall of from about sixteen inches to about twenty-four inches in height.

4. The carry-on article of claim 1 wherein the open-top receptacle is made of flexible fuel resistant material.

5. The carry-on article of claim 1 wherein the open-top receptacle has a flat single ply bottom wall and a hollow sidewall attached to said bottom wall.

6. The carry-on article of claim 1 wherein the open-top receptacle has at least one reinforcing rib extending along its sidewall to prevent ballooning of the sidewall when inflated.

7. The carry-on article of claim 2 wherein the open-top receptacle has at least two independently inflatable sections in the sidewall and wherein the air supply tube is sealed to a lower section whereby the lower section is initially inflated to quickly form a vessel of sufficient capacity to begin receiving the leaked liquid while one or more upper sections are inflated to create the vessel having the at least about 180 gallons liquid capacity.

8. The carry-on article of claim 7 wherein the open-top receptacle has two inflatable sections.

9. A carry-on environmental protection article for a transport truck having a pressurized air hose with a gladhand connector, said article for receiving and retaining leaked liquid from the transport truck, whereby said article is capable of folding to a compact state for easy storage in the transport truck during non-use and readily inflated on site to form an open-top receptacle with upstanding sidewalls for insertion below a source of leaking, said carry-on environmental protection article comprising:

(a) an open-top receptacle capable of holding at least about 180 gallons liquid, said receptacle made of a flexible material having a bottom wall and an inflatable hollow sidewall with a height of from about sixteen inches to about twenty-four inches;

(b) an air supply tube having a proximal end and a distal end with the proximal end secured to the sidewall of the open-top receptacle and in communication with an interior of the sidewall; and (c) a mating gladhand connector secured to the distal end of the air supply tube for connecting to the gladhand connector found on the air hose of the transport truck so that pressurized air from the transport truck can quickly inflate the sidewall of the open-top receptacle to form a vessel to receive the leaked liquid.

10. The carry-on article of claim 9 wherein the open-top receptacle is made of flexible fuel resistant material.

11. The carry-on article of claim 10 wherein the open-top receptacle has a flat single ply bottom wall attached to the sidewall.

12. The carry-on article of claim 9 wherein the open-top receptacle has at least one reinforcing rib extending along its sidewall to prevent ballooning of the sidewall when inflated.

\* \* \* \* \*